(12) United States Patent
Yamawaki et al.

(10) Patent No.: US 6,996,384 B2
(45) Date of Patent: Feb. 7, 2006

(54) RECEIVER AND RADIO COMMUNICATION TERMINAL USING THE SAME

(75) Inventors: Taizo Yamawaki, Tokyo (JP); Satoshi Tanaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 10/455,404

(22) Filed: Jun. 6, 2003

(65) Prior Publication Data

US 2004/0043749 A1    Mar. 4, 2004

(30) Foreign Application Priority Data

Jun. 27, 2002    (JP) ............................ P2002-246096

(51) Int. Cl.
*H04B 1/18* (2006.01)
(52) U.S. Cl. .................. 455/180.1; 455/334; 455/307; 455/209
(58) Field of Classification Search ................ 455/307, 455/209, 314, 317, 254, 180.1, 335, 334, 455/552.1
See application file for complete search history.

(56) References Cited

U.S. PATENT DOCUMENTS

| | | | |
|---|---|---|---|
| 5,883,553 A * | 3/1999 | Tsumura ..................... | 455/209 |
| 5,966,666 A * | 10/1999 | Yamaguchi et al. ...... | 455/552.1 |
| 6,097,974 A * | 8/2000 | Camp et al. .............. | 455/575.7 |
| 6,215,988 B1 * | 4/2001 | Matero ....................... | 455/314 |
| 6,359,940 B1 * | 3/2002 | Ciccarelli et al. ......... | 455/188.1 |
| 6,584,304 B1 * | 6/2003 | Thomsen et al. ........... | 455/307 |
| 6,731,349 B1 * | 5/2004 | Van Der Wijst ......... | 455/180.1 |
| 2003/0003952 A1 * | 1/2003 | Kim .......................... | 455/552 |
| 2003/0032396 A1 * | 2/2003 | Tsuchiya et al. ........... | 455/307 |
| 2003/0069036 A1 * | 4/2003 | Forrester .................. | 455/188.1 |

FOREIGN PATENT DOCUMENTS

| | | |
|---|---|---|
| EP | 0 366 485 | 5/1990 |
| EP | 1 098 449 | 5/2001 |
| WO | WO 97/41643 | 11/1997 |

\* cited by examiner

*Primary Examiner*—Lana Le
(74) *Attorney, Agent, or Firm*—Miles & Stockbridge P.C.

(57) ABSTRACT

Disclosed is a small-size receiver that exhibits high sensitivity when used with a plurality of frequencies or a plurality of radio communication systems. To provide a small-size, high-sensitivity, direct conversion receiver for use with a plurality of frequencies or a plurality of radio communication systems, the present invention has a high-frequency-input signal path for a low-noise amplifier optimized for use with various frequencies or radio communication systems. The high-frequency-input signal path includes at least one band-pass filter and its input and output matching circuits. A low-loss switching means is used to connect an optimum high-frequency-input signal path to the low-noise amplifier in accordance with a selected operation mode.

11 Claims, 7 Drawing Sheets

RECEIVER AND RADIO COMMUNICATION TERMINAL USING THE SAME

BACKGROUND OF THE INVENTION

1. Field of the Invention

The present invention relates to a receiver for use at a mobile terminal, and more particularly to a receiver that is capable of receiving a plurality of communications complying with different radio communication specifications.

2. Description of Related Art

One example of a conventional receiver is disclosed by EP1098449 and will now be described with reference to FIG. 11, which illustrates a typical example of a conventional receiver. The receiver shown in the figure is a direct conversion receiver that is capable of receiving communications complying with different radio communication specifications. The reference numerals 100 and 101 indicate band-pass filters (hereinafter referred to as the BPFs), which allow signals within a desired frequency band to pass and attenuate spurious signals. The reference numerals 102 and 103 indicate low-noise amplifiers (hereinafter referred to as the LNAs). Components 100 and 102 are used to receive signals within frequency band 1. Components 101 and 103 are used to receive signals within frequency band 2. The reference numeral 104 indicates a selector switch for connecting the output of component 102 or 103 to the inputs of frequency conversion mixers 105, 106 (hereinafter referred to as the MIXes) at the next stage in accordance with the operating frequency band. This selector switch is electronically implemented by a transistor or diode. The input signals to components 105 and 106 are mixed respectively with local signals Lo and LoB, which have the same frequency as the input signals, in order to output a baseband signal. Local signals Lo and LoB have the same frequency but are 90 degrees out of phase with each other. These local signals are generated by a 90-degree phase shifter 109 and a local signal generator 110. Output signals 105 and 106 pass through low-pass filters (hereinafter referred to as the LPFs) 107, 108 respectively for spurious signal attenuation purposes. As a result, baseband I/Q signals are generated. The LPFs 107, 108 are capable of varying their characteristics so as to comply with the radio communication specification for the currently received communication.

In an embodiment disclosed by EP1098449, the number of LNAs must be equal to the number of operating frequency bands because the selector switch is positioned between the LNAs and MIXes. Therefore, the area of the receiver is increased. Further, the receiver's sensitivity is degraded due to an increase in the number of operating frequency bands. These problems will now be described with reference to FIGS. 12 and 13.

FIG. 12 is prepared by the inventor of EP1098449 with reference to FIG. 11 to describe the configuration in which the number of operating frequency bands is increased. It is presumed that the circuitry enclosed by broken line 114 is integrated into a single IC. The LNAs are generally positioned close to the IC's LNA pin in order to avoid performance degradation due to parasitic components. It is therefore difficult to arrange a plurality of LNAs so as to encircle a MIX. Consequently, an increase in the number of operating frequency bands causes an increase in the LNA-to-MIX interconnection distance. When the direct conversion method is employed, no image signal exists in principle. It is therefore common that the LNAs and MIXes are directly interconnected without inserting an image attenuation filter in between. As a result, the signal level lowers due to the interconnection's parasitic capacitance 113, thereby degrading the receiver's sensitivity.

FIG. 13 is prepared by the inventor of EP1098449 to describe the configuration for solving the problem of sensitivity degradation encountered in the configuration shown in FIG. 12. Since sensitivity degradation is caused by the parasitic capacitance of the LNA-to-MIX interconnection, it can be avoided by using MIXes 115 and 116 for frequency band 3, optimizing the layout of LNA 112, MIX 115, and MIX 116, and minimizing the length of interconnection among LNA 112, MIX 115, and MIX 116. However, this solution uses a larger number of MIXes than in the configuration shown in FIG. 10, thereby causing an additional increase in the area of the receiver.

SUMMARY OF THE INVENTION

It is therefore an object of the present invention to solve the above-mentioned problems and provide a small-size, high-sensitivity receiver for use with a plurality of frequencies or a plurality of radio communication systems.

To provide a small-size, high-sensitivity, direct conversion receiver for use with a plurality of frequencies or a plurality of radio communication systems, the present invention has a high-frequency-input signal path for a low-noise amplifier or other amplifier optimized for use with various frequencies or radio communication systems.

The high-frequency-input signal path includes at least one band-pass filter and its input and output matching circuits. A low-loss switching means is used to connect an optimum high-frequency-input signal path to the low-noise amplifier in accordance with a selected operation mode.

More specifically, the receiver of the present invention uses a micromechanical switch (MEMS) as the switching means. The micromechanical switch is a mechanical switch that is produced by a method similar to that for semiconductor integrated circuit production. In other words, this micromechanical switch is produced by repeating an insulation film/conductive film accumulation process, associated photolithographic process, and chemical/physical etching process on the entire substrate. The dimensions of the micromechanical switch are several micrometers to hundreds of micrometers in the in-plane direction of the prepared substrate and less than one micrometer to tens of micrometers in the perpendicular direction of the substrate. Various drive methods are applicable to the micromechanical switch, including the use of an electrostatic drive, a magnetic drive, a piezoelectric drive by a piezo element, or a drive provided by a bimetal consisting of a heating element and a plurality of metals having different rates of thermal expansion. As described above, the micromechanical switch differs from common relays and mechanical switches mainly in preparation method, dimensions, and energy required for drive.

Further, the receiver of the present invention is designed so that the characteristic of at least one of low-noise amplifiers, mixers, and low-frequency filters, which are contained in the receiver, is variable in accordance with the radio communication system from which communications are received. Therefore, the optimum reception characteristics result without regard to the radio communication system from which communications are received.

More specifically, a high-frequency input path and a switching means are mounted in a single module, and a low-noise amplifier and a circuit forming a receiver connected to the output of the low-noise amplifier are implemented by a single IC.

Alternatively, the high-frequency input path, the switching means, and the above IC may be mounted in a single module.

To handle a plurality of frequencies or a plurality of radio communication systems, the radio communication terminal of the present invention uses one of the receivers described above, and uses; for transmissions purposes, a transmitter supporting a plurality of frequencies or a plurality of radio communication systems, and a power amplifier connected to the output of the transmitter. The connection among an antenna, receiver, and power amplifier is made via a front-end block. The front-end block operates so as to establish an appropriate connection according to a selected operation mode. The operation of the radio communication terminal is controlled by a baseband signal processing block. The baseband signal processing block outputs a baseband signal to the transmitter and inputs the receiver's output signal.

DETAILED DESCRIPTION OF THE PREFERRED EMBODIMENTS

The receiver for handling a plurality of frequencies or a plurality of systems according to preferred embodiments of the present invention will now be described in detail with reference to the accompanying drawings.

Embodiment 1

First of all, the configuration of the receiver according to the present invention will be described with reference to FIGS. 1 to 4.

Figure 1:
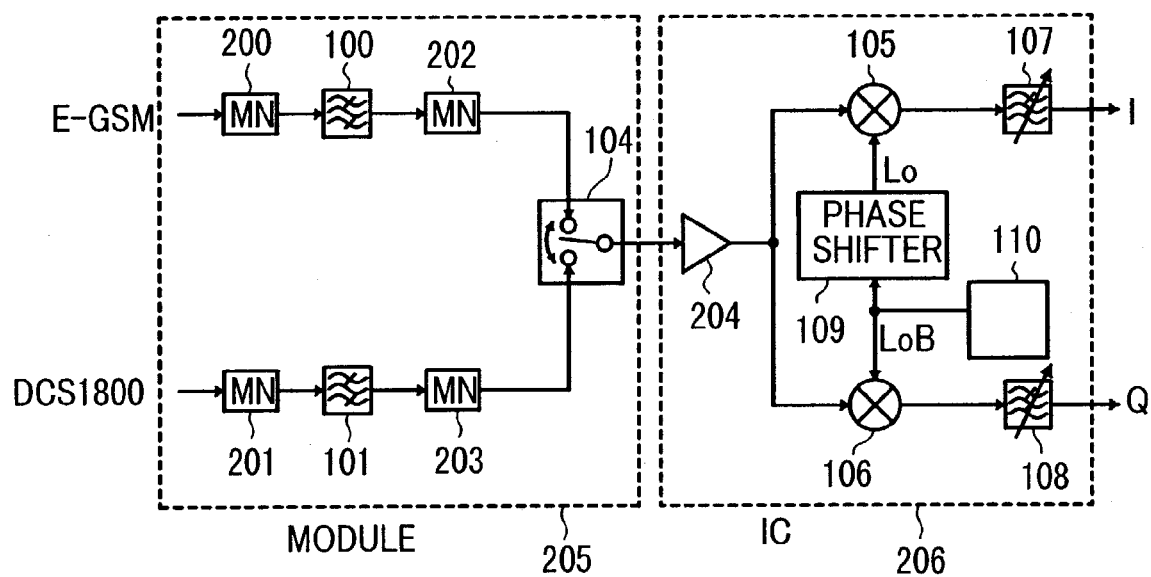
FIG. 1 is a block diagram illustrating a first embodiment.

FIG. 1 illustrates the configuration of a first embodiment of the present invention.

Figure 2:
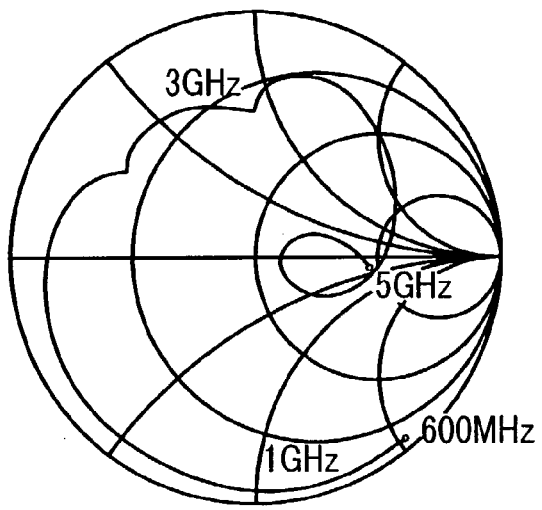
FIG. 2 is a Smith chart illustrating the input impedance of a LNA.

FIG. 2 is a Smith chart illustrating the input impedance of a common LNA.

Figure 3:
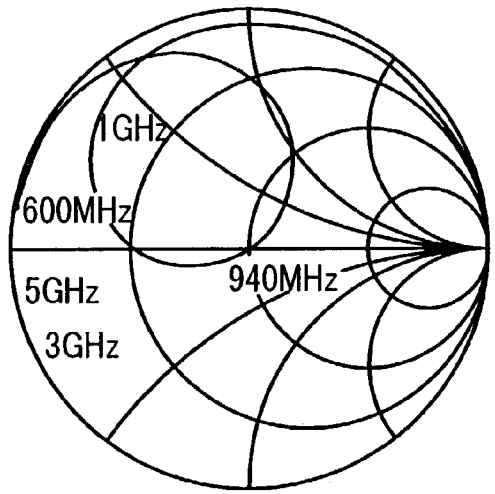
FIG. 3 illustrates the LNA input impedance that prevails when the input of a LNA is adjusted to match the E-GSM band.

FIG. 3 shows an example in which a matching circuit is connected to the input of the above LNA so as to match the E-GSM (Extended Global System for Mobile communications 900) whose receive frequency band ranges from 925 to 960 MHz.

The two-band receiver of the present invention covers two cellular phone bands that are used in Europe: E-GSM (band: 925 to 960 MHz) and DCS 1800 (Digital Cellular System 1800; band: 1710 to 1785 MHz).

In FIG. 1, the reference numerals 200 and 201 indicate respective input matching circuits for components 100 and 101. The reference numerals 202 and 203 indicate respective output matching circuits for components 100 and 101. The reference numeral 104 indicates a micromechanical switch (hereinafter referred to as the MEMS) for connecting either matching circuit 202 or matching circuit 203 to the LNA 204. The MEMS is a switch that is produced by a method similar to that for semiconductor integrated circuit production. More specifically, the MEMS is produced by repeating an insulation film/conductive film accumulation process, associated photolithographic process, and chemical/physical etching process on the entire substrate. The dimensions of the MEMS are several micrometers to hundreds of micrometers in the in-plane direction of the prepared substrate and less than one micrometer to tens of micrometers in the perpendicular direction of the substrate. Various drive methods are applicable to the MEMS, including the use of an electrostatic drive, a magnetic drive, a piezoelectric drive by a piezo element, or a drive provided by a bimetal consisting of a heating element and a plurality of metals having different rates of thermal expansion. As described above, the MEMS differs from common relays and mechanical switches mainly in preparation method, dimensions, and energy required for drive. Further, the MEMS is characterized by the fact that its insertion loss is approximately 0.1 dB, which is lower than that of an electronic switch based on a PIN diode or FET. The MEMS is also at an advantage in that it can provide a switch having one input and a plurality of outputs or a plurality of inputs and one output while minimizing the loss.

MNs 202 and 203 are optimized respectively for the E-GSM and DCS 1800 bands. FIG. 3 indicates that when an optimized matching circuit is used for the E-GSM band, the matching constant is not optimized for the DCS 1800 band. The reason is that the matching circuit is narrow-banded in order to optimize the performance of component 204 (in terms of gain and noise).

Figure 4:
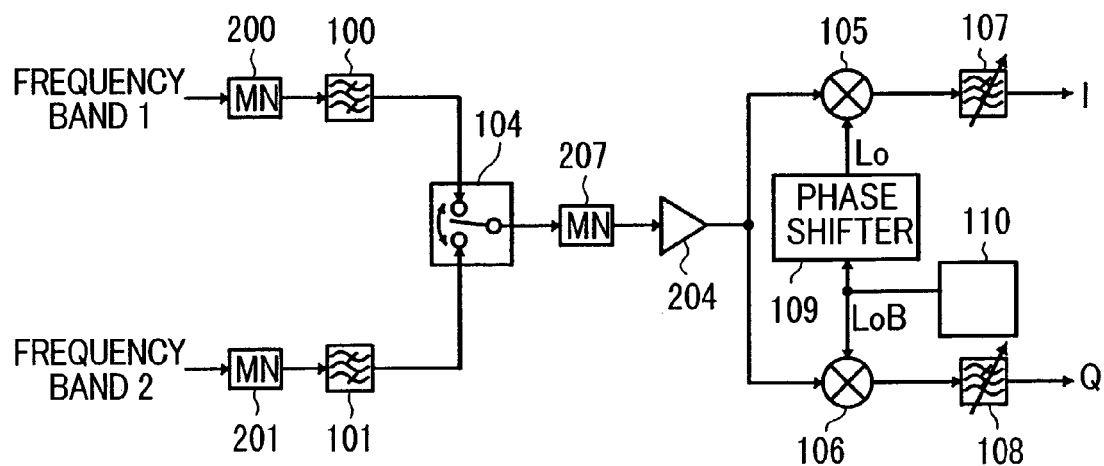
FIG. 4 is a block diagram that illustrates how the receiver is configured when wide-band matching is applied for LNA input matching purposes.

FIG. 4 illustrates an exemplary modification of the present invention, which was found in an invention process. If one matching circuit, that is, a wide-band matching circuit 207, is used, as shown in FIG. 4, to provide matching for both the E-GSM and DCS 1800 bands, the performance of the low-noise amplifier 204 degrades, thereby lowering the receiver's sensitivity for the aforementioned reason.

The circuitry contained in the IC 206 is implemented by a semiconductor integrated circuit so that a single IC is produced. The circuitry contained in module 205 is implemented as a module that is separate from the IC 206, because band-pass filters 100 and 101 and MEMS 104 need to be hermetically sealed.

The operation of the receiver will now be described with reference to FIG. 1.

While the receiver is in a mode for E-GSM signal reception, a received signal is entered into matching circuit 200. Matching circuit 200 provides matching between the input of band-pass filter 100 and the antenna connected to the front of matching circuit 200. Band-pass filter 100 allows 925 MHz to 960 MHz signals to pass and suppresses the signals within the other frequency bands as desired. A SAW filter or dielectric filter is used as band-pass filter 100. The MEMS 104 is controlled so as to connect matching circuit 202 and low-noise amplifier 204 only. The output signal generated by matching circuit 202 is delivered to the low-noise amplifier 204 via the MEMS 104. The circuitry contained in the IC 206 is a direct conversion receiver, which performs the same operation as the aforementioned conventional example to output baseband I/Q signals as the input signals for the low-noise amplifier 204.

While the receiver is in a mode for DCS 1800 signal reception, a received signal is entered into matching circuit 201. The baseband I/Q signals are then output by performing the same operation as in the E-GSM signal mode. However, the MEMS 104 is controlled so as to connect matching circuit 203 and low-noise amplifier 204 only.

Therefore, the present embodiment reduces the number of LNAs required for a plurality of frequency bands to one although a plurality of LNAs are required in situations where a switch is provided between a LNA and MIX. Further, since only one LNA is used, receiver sensitivity degradation will not possibly take place although it could occur if the length of the LNA-to-MIX interconnection increases.

Embodiment 2

Figure 5:
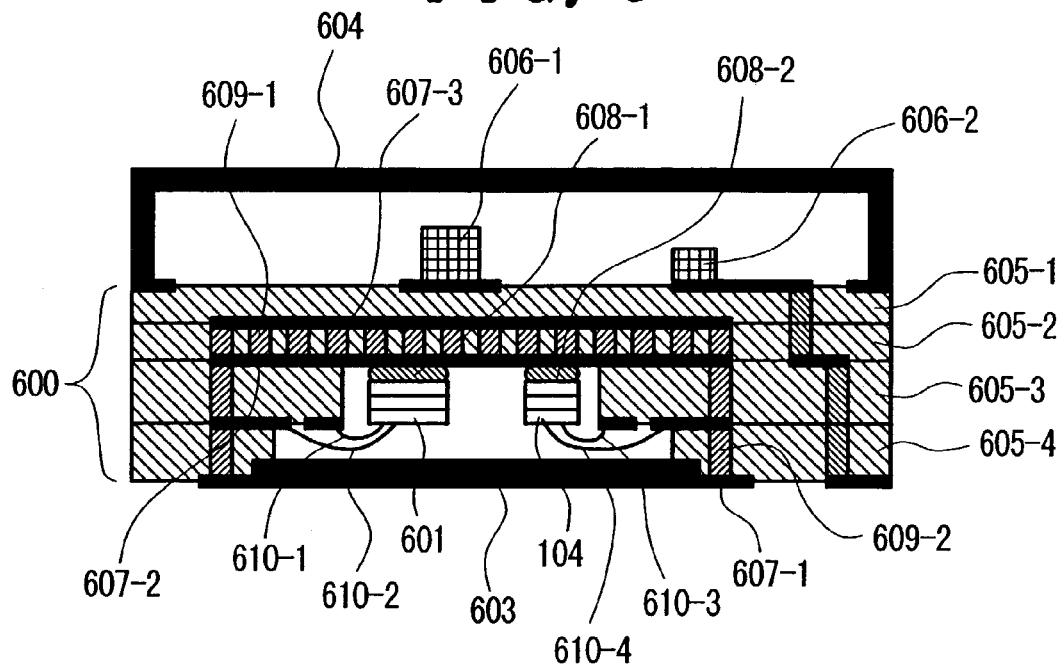
FIG. 5 is a cross-sectional view of a second embodiment.

FIG. 5 is a cross-sectional view of a module 205 according to a second embodiment. A glass ceramic multilayer substrate 600 comprises four dielectric layers 605-1, 605-2, 605-3, 605-4, intervening layers, and front and rear conductive layers 607. In the embodiment shown in FIG. 5, a SAW filter 601 is used as the BPF. The SAW filter 601 is equivalent to filter 100/101 and capable of handling two bands. The SAW filer 601 and MEMS 104 are positioned within grooves in part of dielectric layers 605-3 and 605-4 and hermetically sealed by installing a metal cover 603 over the underside. Each component is secured to conductor 607-2 on the glass ceramic multilayer substrate 600 with conductive adhesives 608-1, 608-2. The electrical terminals on the SAW filter 601 and MEMS 104 are electrically connected to the multilayer substrate by bonding wires 610. Particularly, the ground terminals for the bonding wires 610 and MEMS 104 are electrically connected to conductor 607-2 on the back surfaces of the components.

The input/output sections of the bonding wires 610 are connected to a matching circuit. The matching circuit comprises chip components 606, which are soldered to the uppermost layer of the glass ceramic multilayer substrate 600, and an inductor, capacitor, and path, which are positioned within the glass ceramic multilayer substrate 600 as internal layers.

In the embodiment shown in FIG. 5, the chip components 606 are mounted on the front surface of the glass ceramic multilayer substrate 600, and a metal cap 604 is installed as an electromagnetic shield.

Embodiment 3

Figure 6:
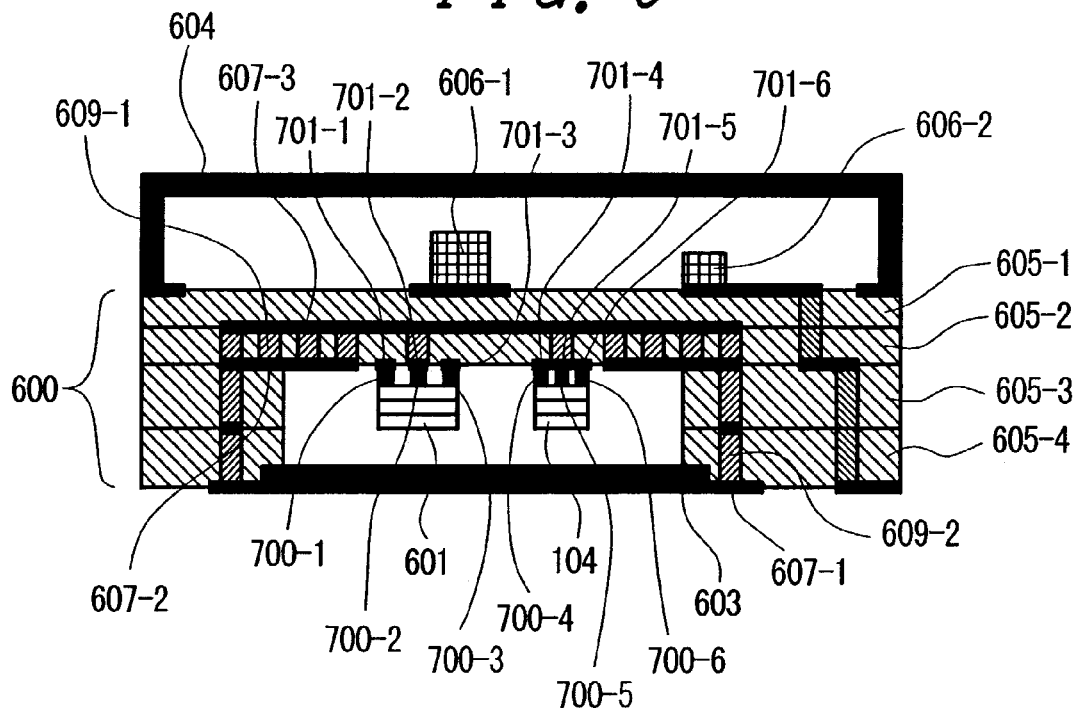
FIG. 6 is a cross-sectional view of a third embodiment.

FIG. 6 is a cross-sectional view of a metal-bump-based module 205 according to a third embodiment.

The input and output terminals on the SAW filter 601 are connected to conductors 701-1 and 701-3 on the ceramic substrate via metal bumps 700-1 and 700-3. The SAW filter's ground terminal is connected to conductor 701-2 on the ceramic substrate via metal bump 700-2. Conductor 701-2 is connected to backside conductor 607-3 on the ceramic substrate via the ceramic substrate's internal layer interconnection.

The input and output terminals on the MEMS 104 are connected to conductors 701-4 and 701-6 on the ceramic substrate via metal bumps 700-4 and 700-6. The ground terminal on the MEMS 104 is connected to conductor 701-5 on the ceramic substrate via metal bump 700-5. Conductor 701-5 is connected to backside conductor 607-3 on the ceramic substrate via the ceramic substrate's internal layer interconnection.

Embodiment 4

Figure 7:
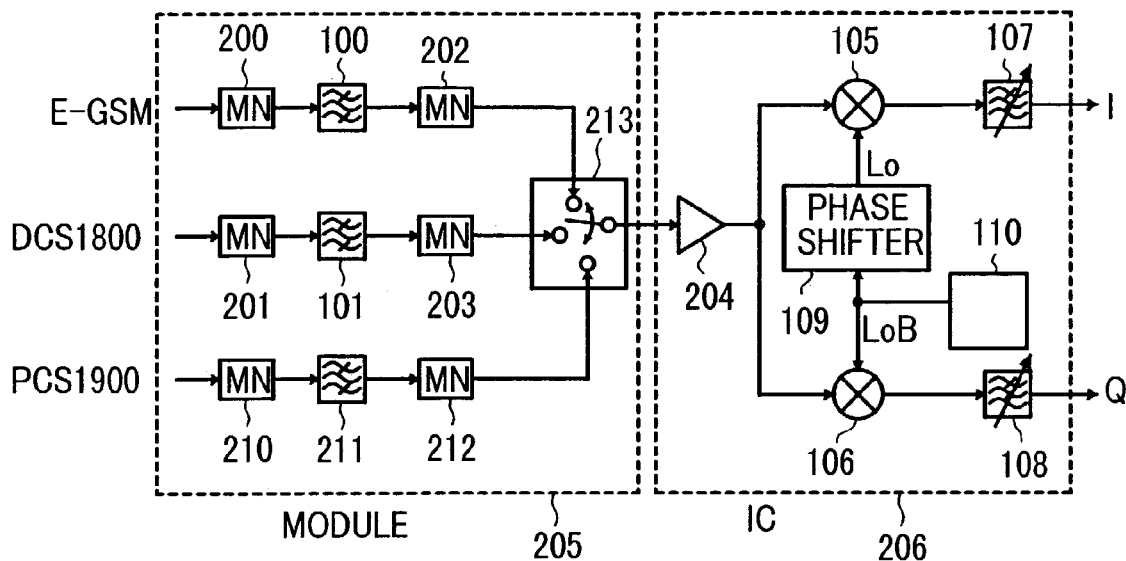
FIG. 7 is a block diagram illustrating a fourth embodiment.

A fourth embodiment of the present invention will now be described with reference to FIG. 7. The present embodiment furnishes the receiver according to the first embodiment shown in FIG. 1 with an additional capability of handling the 1.9 GHz band of PCS 1900 (Personal Communication System 1900; band: 1930 to 1990 MHz) by adding matching circuits 210, 212 and a BPF 211. In the present embodiment, the MEMS 104 is also replaced with a 3-input, 1-output MEMS 213.

Embodiment 5

Figure 8:
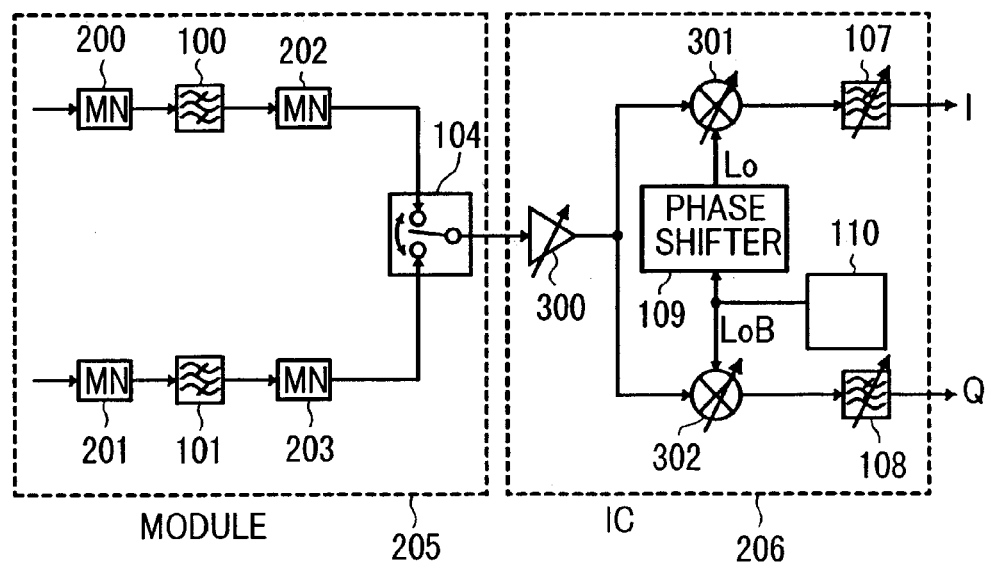
FIG. 8 is a block diagram illustrating a fifth embodiment.

A fifth embodiment of the present invention will now be described with reference to FIG. 8. In the receiver according to the present embodiment, a variable-characteristic LNA 300 and variable-characteristic MIXes 301, 302 are used in replacement of the counterparts 204, 105, 106 of the first embodiment shown in FIG. 1. Components 300, 301, and 302 are designed so that their characteristics vary as needed to match the radio communication system from which the receiver receives communications. The term "characteristics" as used herein means gain, dynamic range, noise characteristic, and current consumption.

Embodiment 6

Figure 9:
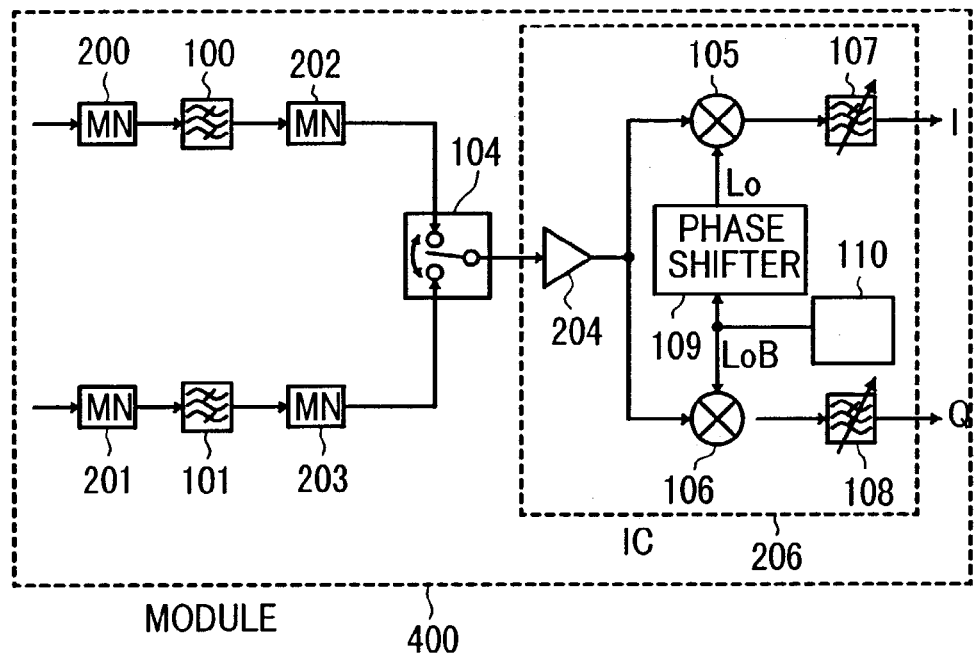
FIG. 9 is a block diagram illustrating a sixth embodiment.

A sixth embodiment of the present invention will now be described with reference to FIG. 9. In the receiver according to the present embodiment, modules 205 and 206 of the first embodiment shown in FIG. 1 are replaced by a single module 400. When the embodiment shown in FIG. 1 is adopted, a cellular terminal manufacturer generally purchases modules 205 and 206 and develops a cellular terminal with them. In such a situation, the matching constants of matching circuits 202 and 203 vary with the characteristics of a transmission line between modules 205 and 206. Therefore, the terminal manufacturer must formulate a design so as to provide optimum transmission line characteristics for the matching constants of matching circuits 202 and 203. In the present embodiment, however, the module manufacturer producing module 400 designs matching circuits 202 and 203 and transmission line. Therefore, the design can easily be accomplished. Further, the terminal manufacturer purchases an optimally designed module 400. As a result, terminal development will easily be achieved.

Embodiment 7

Figure 10:
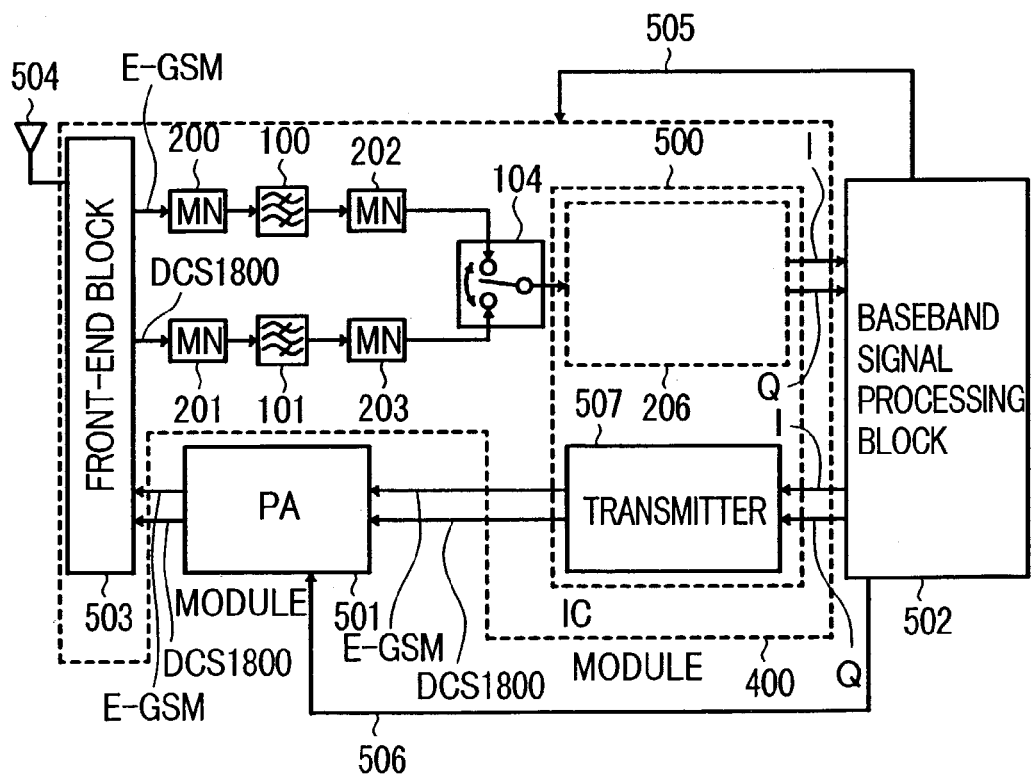
FIG. 10 is a block diagram illustrating a seventh embodiment.
Figure 11:
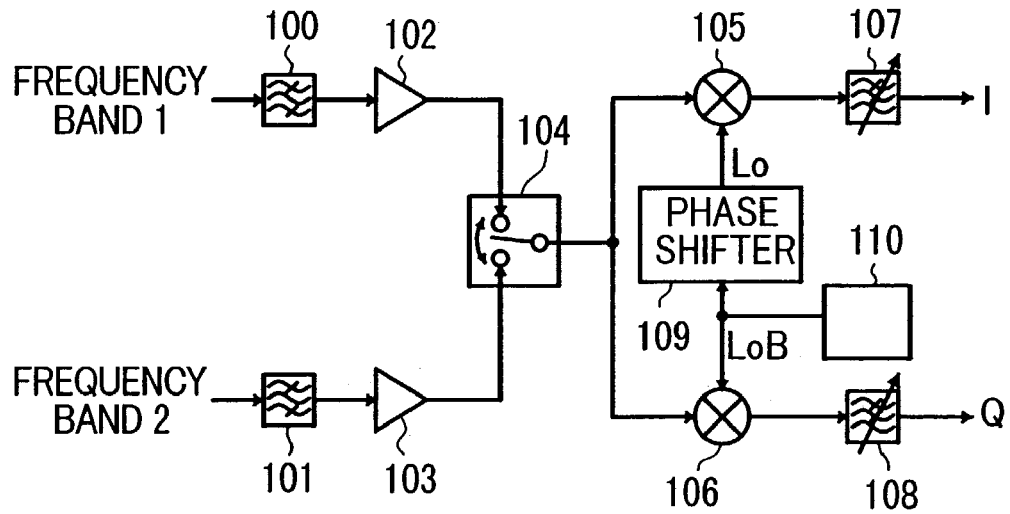
FIG. 11 is a block diagram illustrating a conventional receiver.
Figure 12:
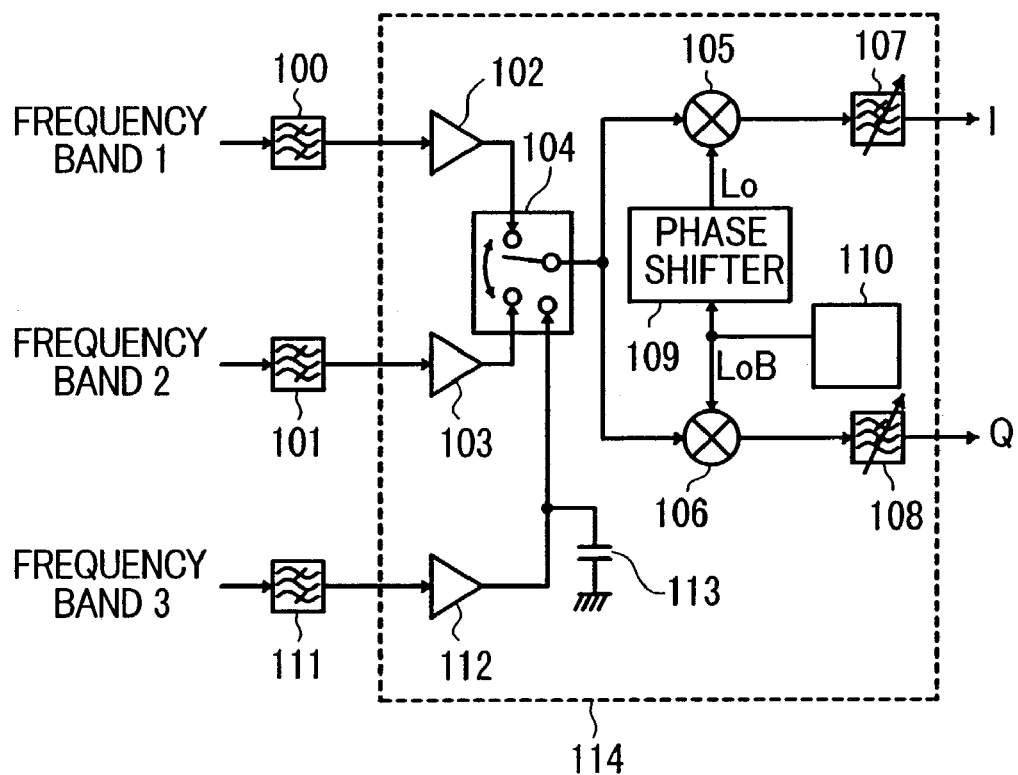
FIG. 12 is a block diagram illustrating a conventional receiver that is extended to cover three bands.
Figure 13:
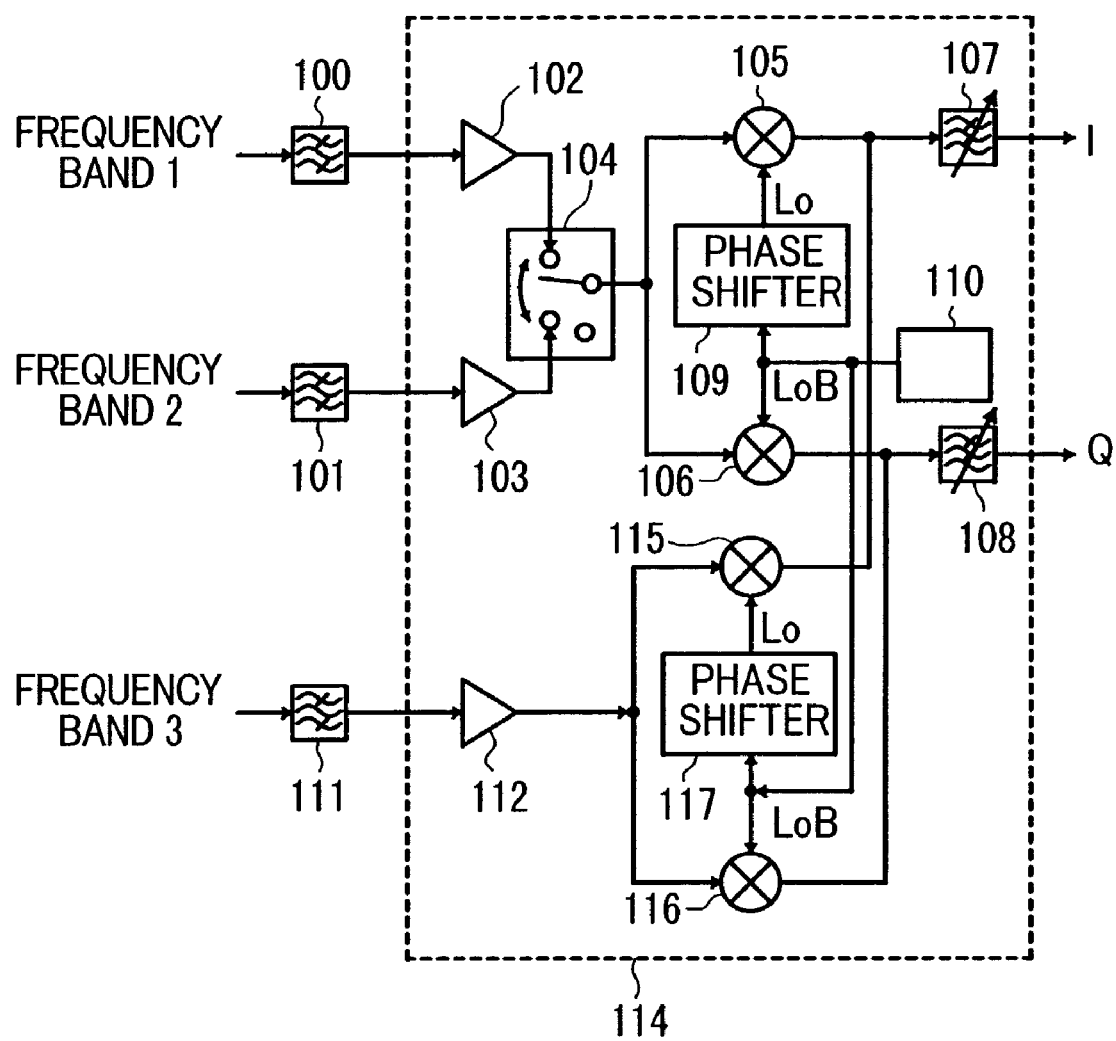
FIG. 13 is a block diagram illustrating a conventional receiver that is extended to cover three bands.

A seventh embodiment of the present invention will now be described with reference to FIG. 10. FIG. 10 illustrates the configuration of a cellular terminal that handles the E-GSM and DCS 1800 bands. The cellular terminal comprises an antenna 504, modules 400, 501, and a baseband signal processing block 502. Module 400 is obtained by adding a front-end block 503 and a transmitter 507 to the module shown in FIG. 9. A receiver 206 and the transmitter 507 are both built in the same IC. The front-end block 503 establishes an appropriate connection among components 504, 200, 201, and 501 depending on whether the cellular terminal is transmitting or receiving and the radio communication system is of an E-GSM type or DCS 1800 type. The baseband signal processing block 502 performs a demodulation, error correction, or other appropriate signal process on the signal output from the receiver 206 to obtain a desired voice signal or data signal, modulates the signal to a voice signal or data signal for a transmission from the antenna, performs an error correction or other appropriate signal process on the modulated signal, and enters the processed signal to the transmitter 507. The signal used between the baseband signal processing block 502 and module 400 is in an analog I/Q signal form. However, this is merely an exemplary form. For example, the digital I/Q signal form is also applicable. The operation of the cellular terminal is controlled by control signals 505, 506, which are output from the baseband signal processing block 502. The transmitter 507 performs a frequency conversion, gain addition, spurious signal elimination, or other desired process on the signal entered from the baseband signal processing block 502, and outputs the processed signal to a PA module 501. The PA module adds desired gain to the output signal from the transmitter 507 and outputs the resulting signal to the front-end block 503.

The scopes of circuit integration and modularization for the configuration shown in FIG. 10 are merely cited as examples. Various other scopes of circuit integration and modularization are also applicable.

In the foregoing embodiments, a two-band receiver covering both the E-GSM and DCS 1800 bands is mainly described. However, it goes without saying that some other two-band receivers, such as a receiver covering a combination of the E-GSM and W-CDMA (1995 MHz to 2180 MHz) bands, three-band receivers covering the E-GSM, DCS 1800, and W-CDMA bands, and receivers covering four or more bands can also be implemented by applying the same extension method as described above.

The receiver according to the present invention is at an advantage in that it can be downsized because the LNAs and mixers used for a receiver handling a plurality of radio communication systems can be integrated into a single whole.

What is claimed is:

1. A receiver comprising:
   a first input signal path, which includes a first input matching circuit, a first filter whose input is the output of the first input matching circuit, and a first output matching circuit whose input is the output of the first filter;
   a second input signal path, which includes a second input matching circuit, a second filter whose input is the output of the second input matching circuit, and a second output matching circuit whose input is the output of the second filter;
   a selector switch, which uses the first and second input signal paths as inputs, and outputs either of said inputs;
   an amplifier whose input is the output of the selector switch;
   a first output signal path, which includes a first mixer whose input is the output of the amplifier and a first spurious signal suppression filter whose input is the output of the first mixer; and
   a second output signal path, which includes a second mixer whose input is the output of the amplifier and a second spurious signal suppression filter whose input is the output of the second mixer.

2. The receiver according to claim 1, wherein the employed configuration is such that the characteristic of at least one of said amplifier, mixers, and spurious signal suppression filters is variable.

3. The receiver according to claim 1, wherein said first and second input signal paths and said selector switch are mounted in a single module and said amplifier and said first and second output signal paths are integrated into a single IC.

4. The receiver according to claim 1, wherein said amplifier and said first and second output signal paths are integrated into a single IC and said first and second input signal paths and said selector switch are mounted in a single module.

5. The receiver according to claim 1, wherein said selector switch is a micromechanical switch.

6. The receiver according to claim 1, further comprising a third input signal path, which includes a third input matching circuit, a third filter whose input is the output of the third input matching circuit, and a third output matching circuit whose input is the output of the third filter,
   wherein the output of the third input signal path is used as the input of said selector switch; and
   wherein said selector switch outputs the input from the first, second, or third input signal path.

7. A reception module, comprising:
   a reception circuit;
   a substrate on which at least a part of said reception circuit is mounted; and
   a covering material for sealing at least a part of said reception circuit,
   wherein said reception circuit comprises:
   a first input signal path, which includes a first input matching circuit, a first filter whose input is the output of the first input matching circuit, and a first output matching circuit whose input is the output of the first filter;
   a second input signal path, which includes a second input matching circuit, a second filter whose input is the output of the second input matching circuit, and a second output matching circuit whose input is the output of the second filter;
   a selector switch, which uses the first and second input signal paths as inputs, and outputs either of said inputs;
   an amplifier whose input is the output of the selector switch;
   a first output signal path, which includes a first mixer whose input is the output of the amplifier and a first spurious wave suppression filter whose input is the output of the first mixer; and
   a second output signal path, which includes a second mixer whose input is the output of the amplifier, and a second spurious wave suppression filter whose input is the output of the second mixer.

8. The reception module according to claim 7, wherein said substrate is a dielectric multilayer substrate, which carries an IC incorporating at least a part of said reception circuit.

9. The reception module according to claim 7, wherein said first and second filters are SAW filters, which are mounted on said substrate.

10. The reception module according to claim 7, wherein said selector switch is a MEMS device, which is mounted on said substrate.

11. A radio communication terminal, comprising:
    a baseband signal processing block;
    a transmitter for receiving a first baseband signal input from the baseband signal processing block;
    a power amplifier connected to the output of the transmitter;
    a receiver for outputting a second baseband signal to said baseband signal processing block;
    an antenna; and a front-end block for connecting to the input of the antenna, the input of the receiver, and the output of the power amplifier, wherein the transmitter, the power amplifier, the receiver, and the antenna have functions applicable to a plurality of radio communication systems, and the operation modes of these devices are controlled by the baseband signal processing block;

wherein said receiver includes a plurality of input signal paths and a selector switch for connecting one of the input signal paths to a low noise amplifier;

wherein each of the input signal paths includes at least one band-pass filter, which is connected to an input matching circuit and output matching circuit, and the receiver is of a direct conversion type, which includes the low-noise amplifier and a first output signal path and a second output signal path connected to the output of the low-noise amplifier; and wherein each of the first and second output signal paths includes a mixer and at least one spurious wave suppression filter, and the receiver is configured so as to be capable of receiving signals from a plurality of radio communication systems due to a switching operation performed by the selector switch.

* * * * *

UNITED STATES PATENT AND TRADEMARK OFFICE
CERTIFICATE OF CORRECTION

| | | |
|---|---|---|
| PATENT NO. | : 6,996,384 B2 | Page 1 of 1 |
| APPLICATION NO. | : 10/455404 | |
| DATED | : February 7, 2006 | |
| INVENTOR(S) | : Taizo Yamawaki et al. | |

It is certified that error appears in the above-identified patent and that said Letters Patent is hereby corrected as shown below:

On the title page, in item (30) Foreign Application Priority Data, the foreign prioirty application should be identified as follows:

Aug. 27, 2002  (JP)  ………………………....... P2002-246096

Signed and Sealed this

Tenth Day of October, 2006

JON W. DUDAS
*Director of the United States Patent and Trademark Office*